G. S. BAKER.
BAKER'S OVEN.
APPLICATION FILED JULY 26, 1909.

964,370.

Patented July 12, 1910.
11 SHEETS—SHEET 1.

Witnesses.
Inventor
George Samuel Baker
by
Attorney.

G. S. BAKER.
BAKER'S OVEN.
APPLICATION FILED JULY 26, 1909.

964,370.

Patented July 12, 1910.
11 SHEETS—SHEET 2.

Witnesses.
Inventor
George Samuel Baker
Attorney

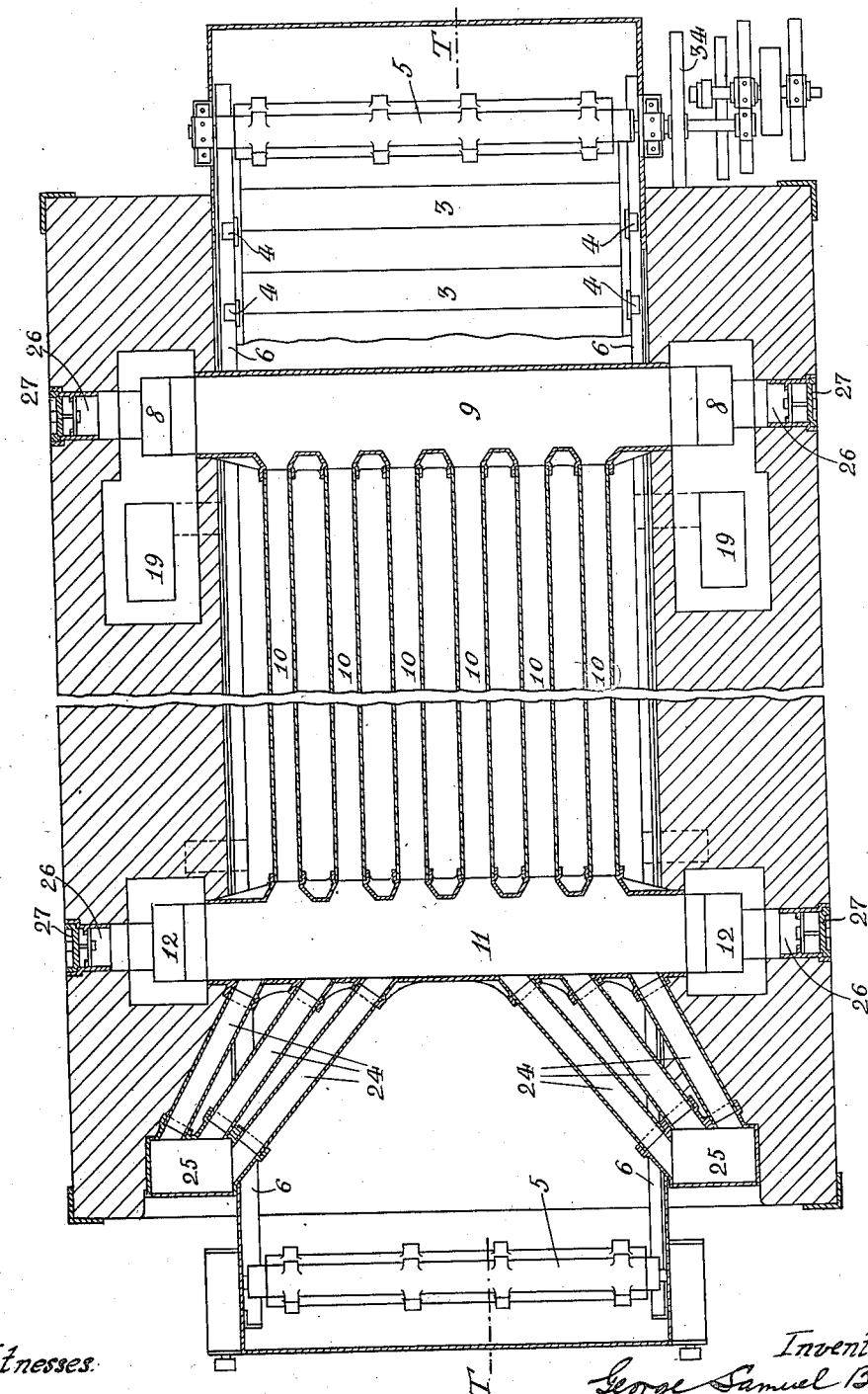

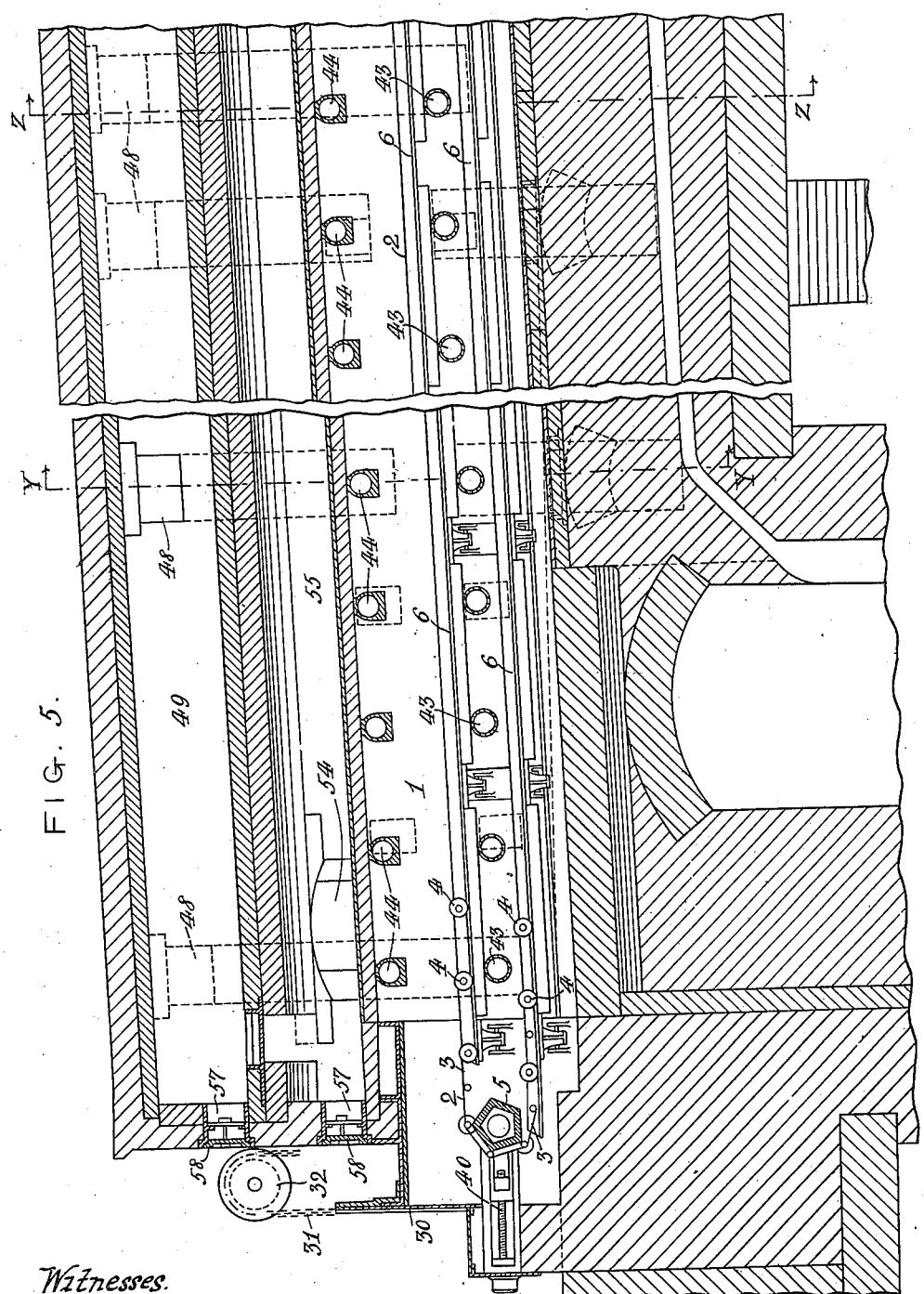

G. S. BAKER.
BAKER'S OVEN.
APPLICATION FILED JULY 26, 1909.

964,370.

Patented July 12, 1910.
11 SHEETS—SHEET 5.

Witnesses
Inventor
George Samuel Baker
by
Attorney

G. S. BAKER.
BAKER'S OVEN.
APPLICATION FILED JULY 26, 1909.

964,370.

Patented July 12, 1910.
11 SHEETS—SHEET 8.

Witnesses.
Inventor
George Samuel Baker
by his Attorney.

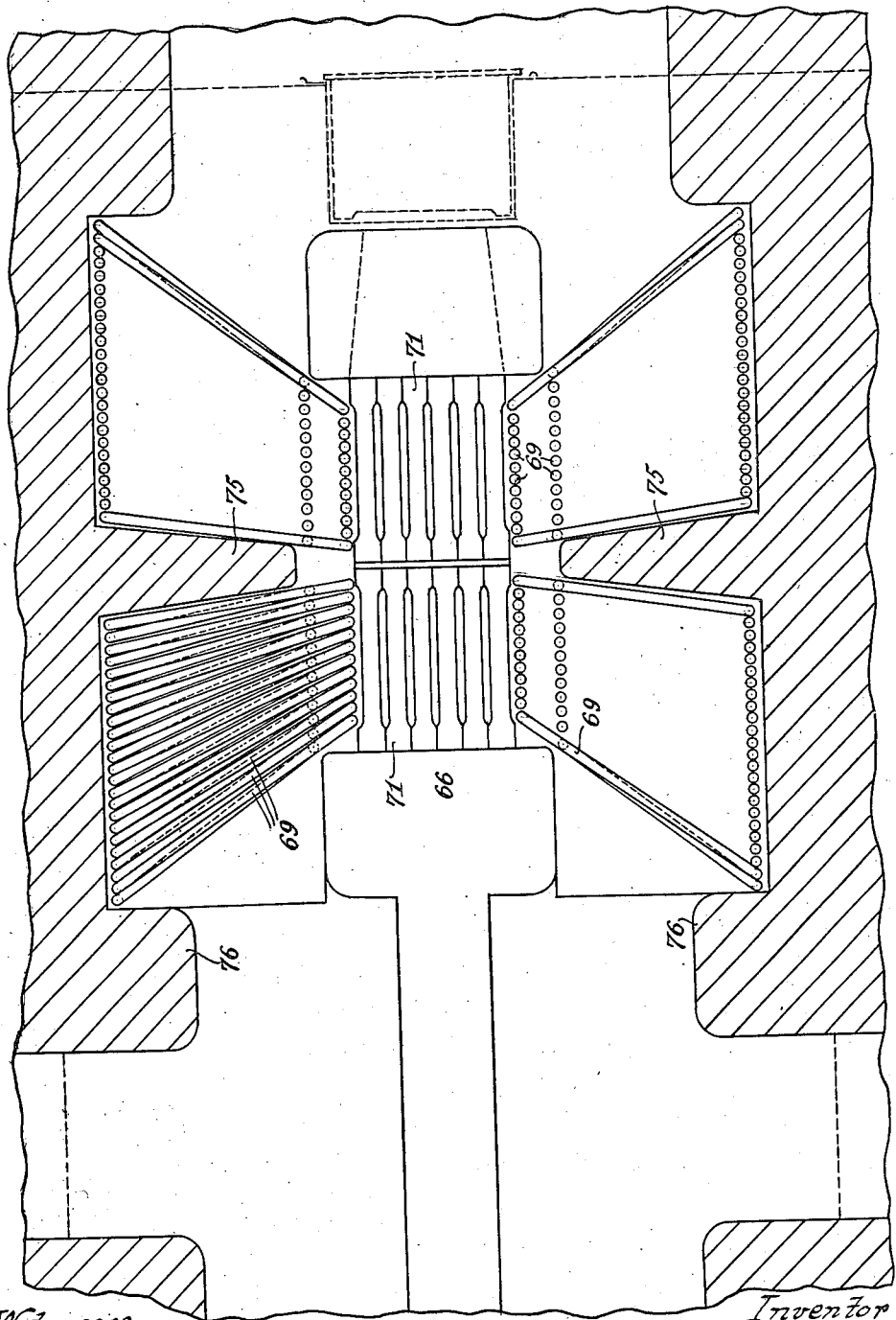

UNITED STATES PATENT OFFICE.

GEORGE SAMUEL BAKER, OF WILLESDEN JUNCTION, LONDON, ENGLAND.

BAKER'S OVEN.

964,370.

Specification of Letters Patent. Patented July 12, 1910.

Application filed July 26, 1909. Serial No. 509,528.

*To all whom it may concern:*

Be it known that I, GEORGE SAMUEL BAKER, a subject of the King of England, residing at Willesden Junction, London, N. W., England, have invented certain new and useful Improvements in Bakers' Ovens, of which the following is a specification.

This invention relates to bakers' ovens, more particularly of that class which are provided with an endless or continuous sole or plate adapted for movement longitudinally of the baking chamber, and the object is to provide novel means for efficiently heating said chamber and equalizing the heat therein by means of gases from the furnace passing through flues both above, below and at the sides of the baking chamber in combination with a series of tubes within the baking chamber, said tubes extending longitudinally or transversely of the baking chamber or both and being heated either by gases from the flues referred to or containing water adapted to be heated from the furnace.

The invention comprises the novel features and combinations of parts hereinafter described and specifically pointed out in the appended claims, reference being made to the accompanying drawings showing as examples several embodiments of the invention and wherein—

Figure 1:
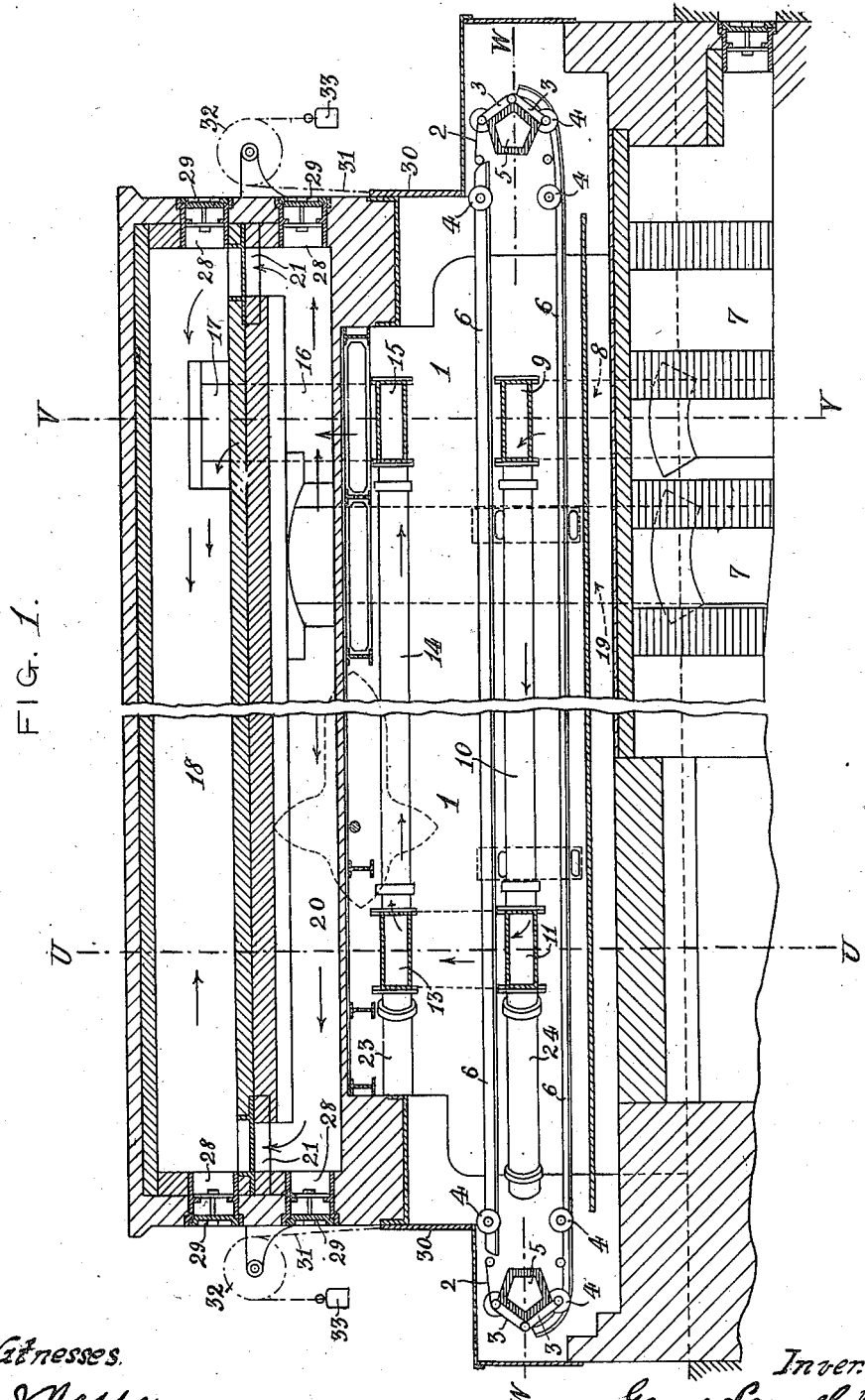
Figure 3:
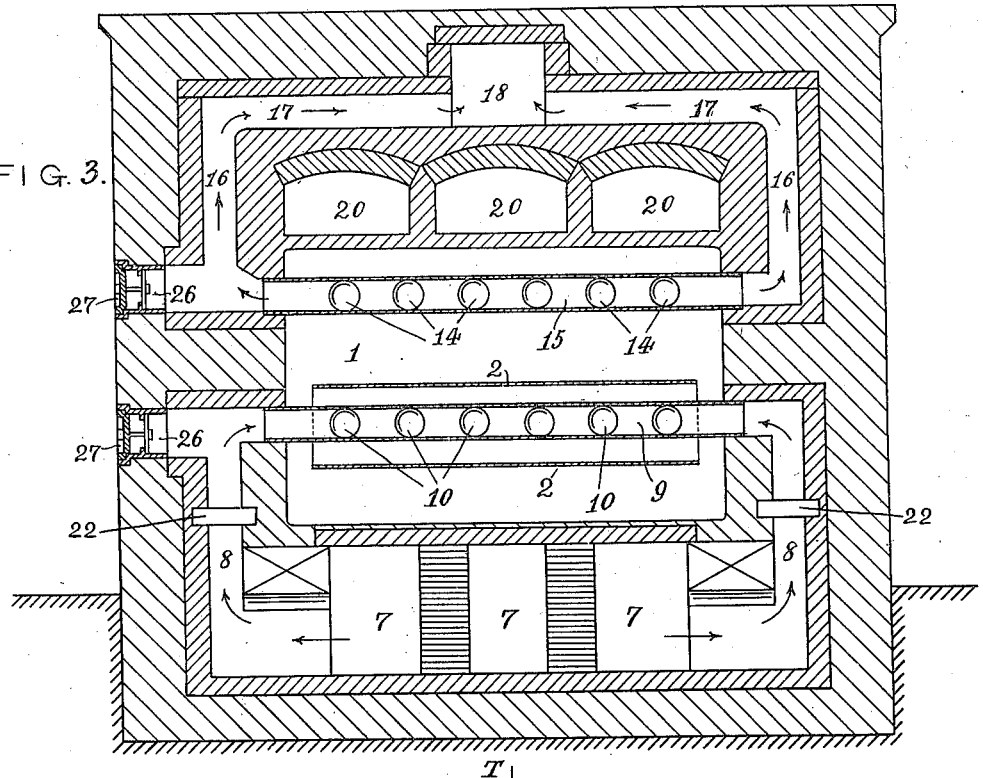
Figure 2:
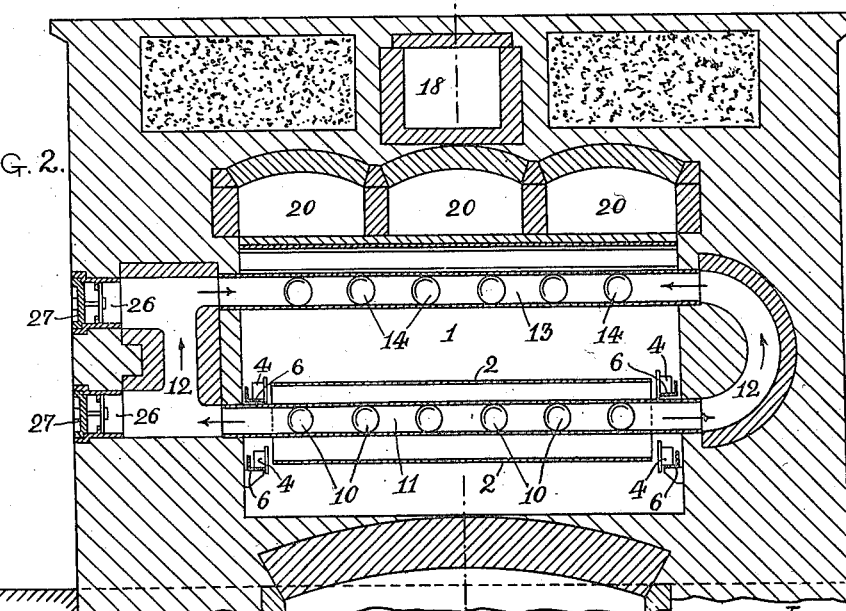
Figure 6:
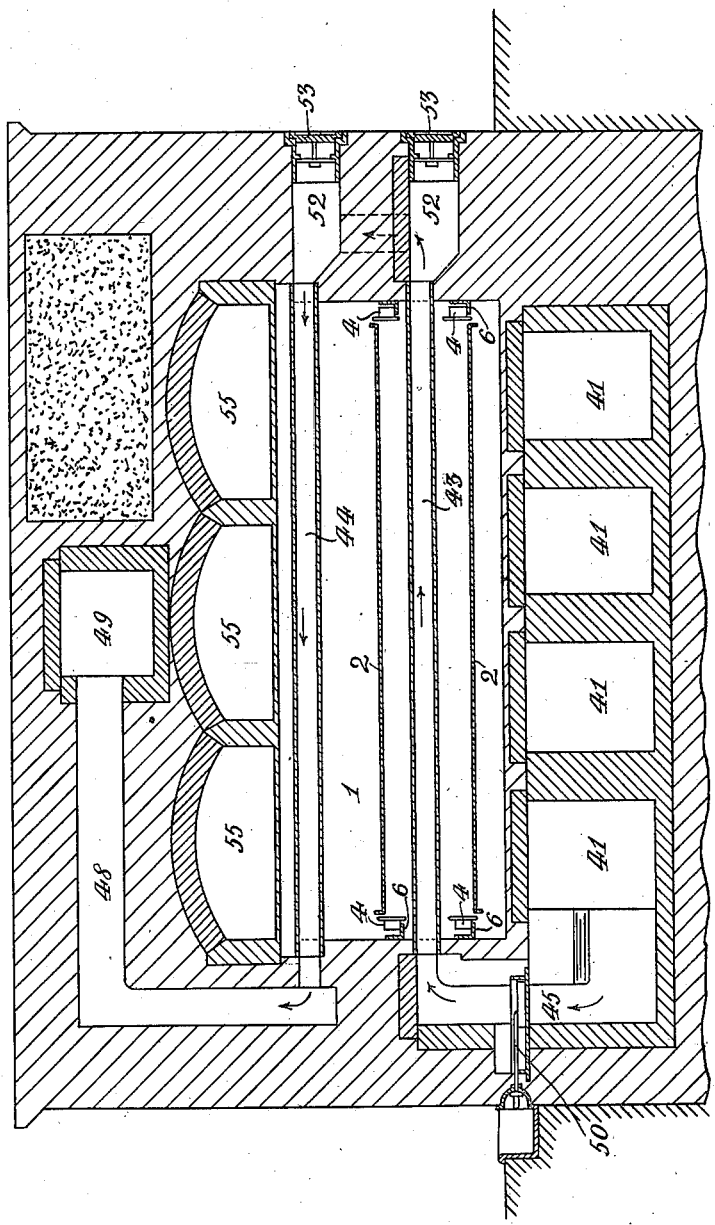
Figure 7:
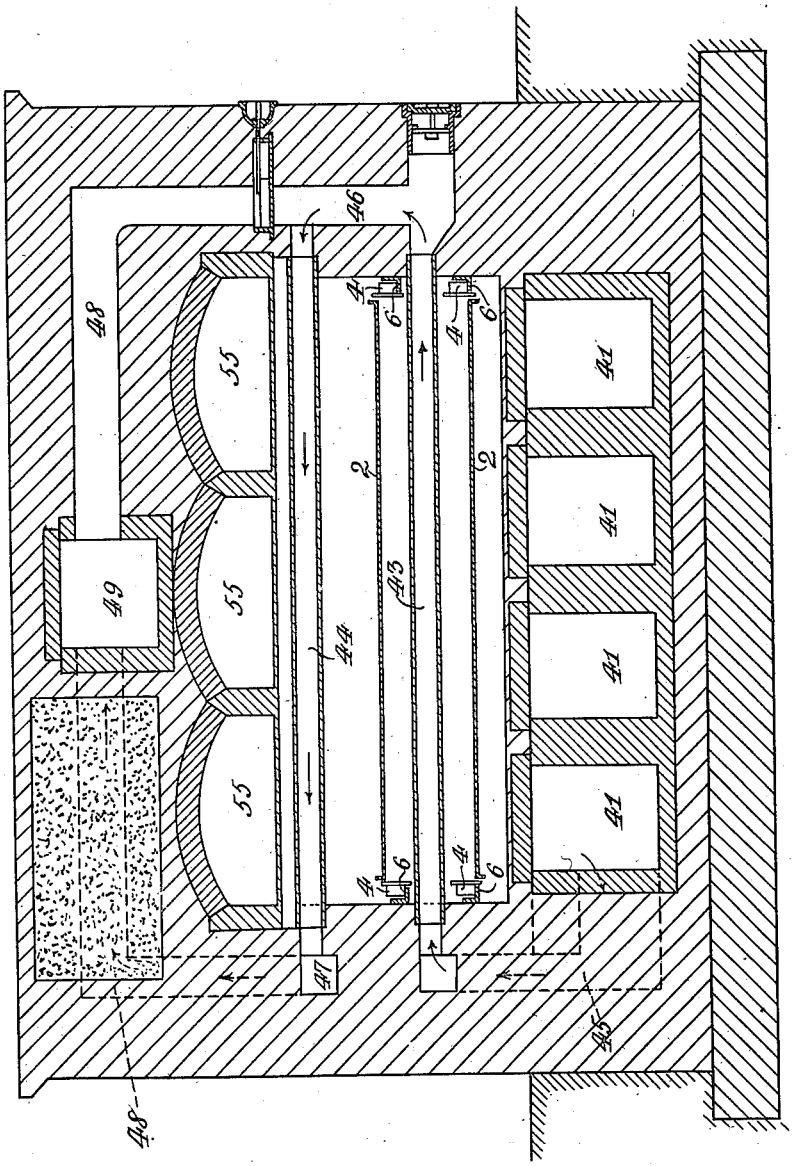
Figure 11:
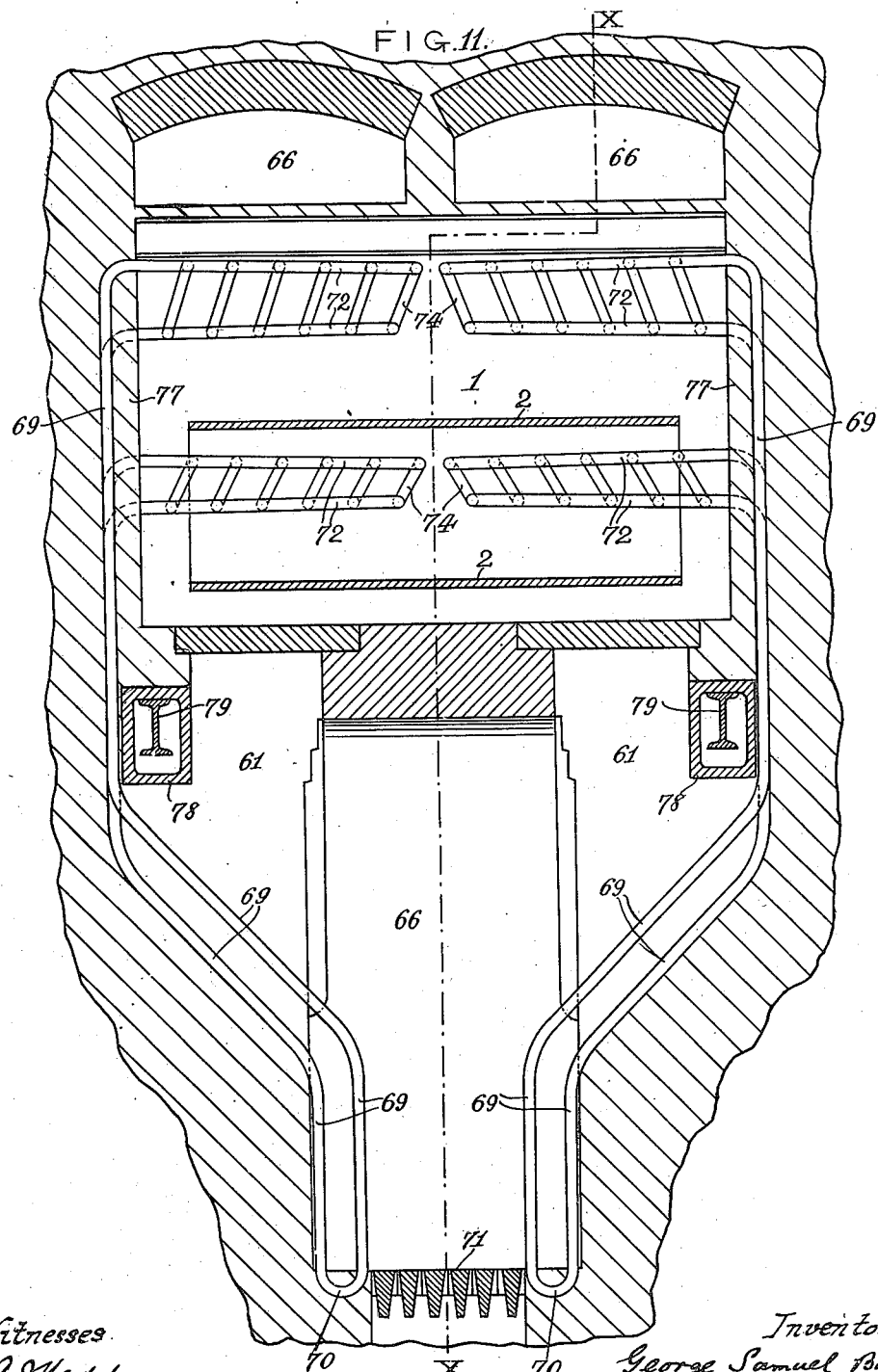
Figure 12:
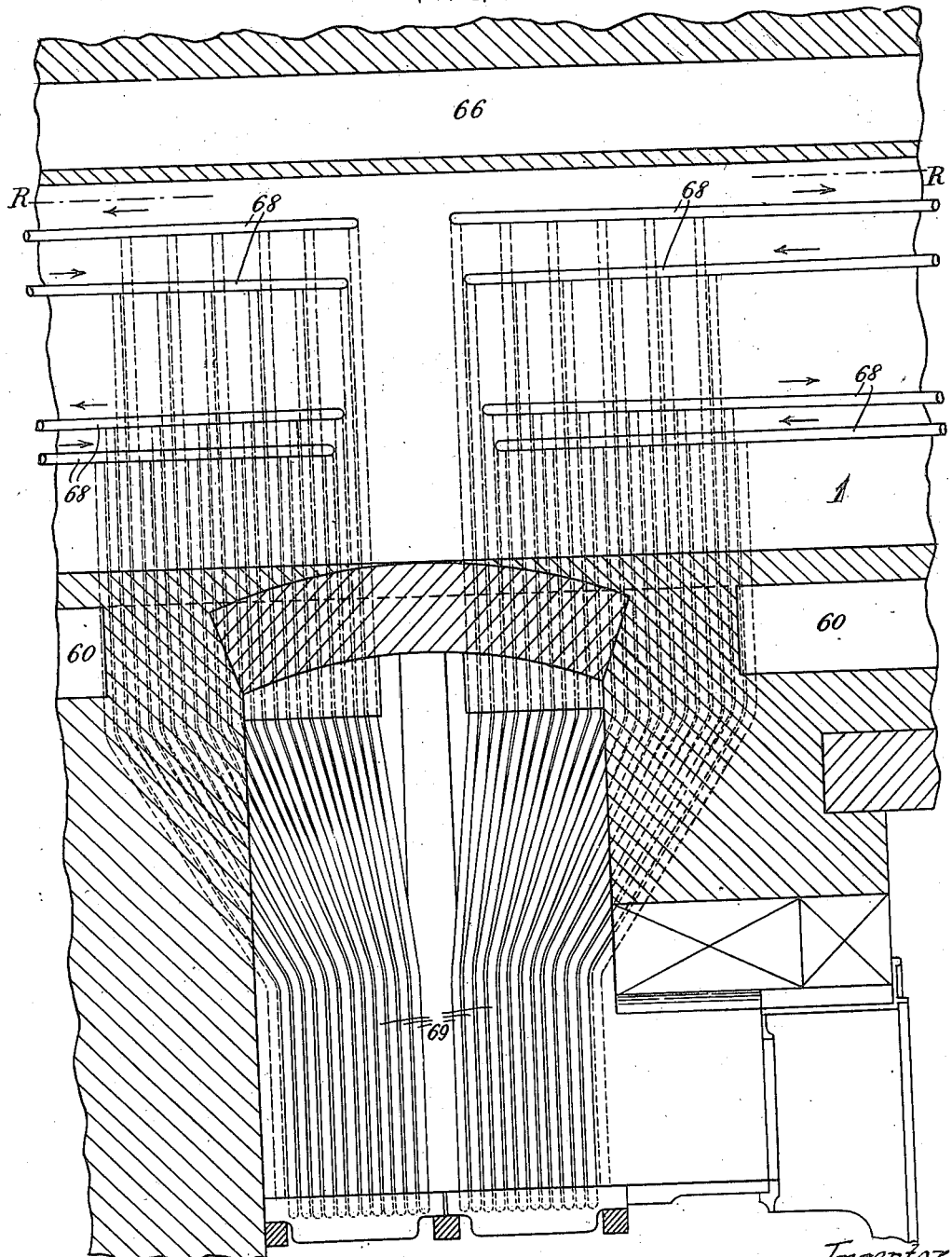

Figures 1 to 4 show various views of an oven constructed according to this invention showing a system of longitudinal tubes in communication with the furnace flues and adapted to be traversed by the gases from said flues, Fig. 1 being a partial central vertical section taken on the line T—T of Figs. 2 and 4, certain parts being shown in elevation. Fig. 2 is a cross section thereof approximately on the line U—U of Fig. 1. Fig. 3 is a cross section approximately on the line V—V of Fig. 1 and Fig. 4 is a partial sectional plan view on the line W—W of Fig. 1. Figs. 5 to 8 show a modification illustrating a modified arrangement of tubes heated by the flue gases and whose general direction is transverse to the baking chamber, Fig. 5 being a partial longitudinal vertical section thereof, Fig. 6 a cross-section on the line Y—Y of Figs. 5 and 8, Fig. 7 a cross-section on the line Z—Z of Figs. 5 and 8, and Fig. 8 a partial sectional plan view thereof. Figs. 9 to 13 show a modified construction in which the tubes are not in communication with the flues but are closed and contain water which is heated by the furnace gases, Fig. 9 being a vertical central section of this construction, Fig. 10 a sectional plan view of Fig. 9 with parts removed for showing more particularly the arrangement of the tubes, Fig. 11 is a cross-section on the line S—S of Fig. 9 on an enlarged scale. Fig. 12 is a partial longitudinal section on the line X—X of Fig. 11, and Fig. 13 is a partial sectional plan view on the lower line R—R of Fig. 12.

Referring to the construction shown in Figs. 1 to 4, 1 indicates the baking chamber traversed longitudinally by the endless traveling sole 2 formed of a series of articulated plates or links 3, a few only of which are shown in Figs. 1 and 2 for the sake of clearness of illustration. The said links 3 are carried by and pass around polygonal rollers 5 at each end of the baking chamber and carry rollers 4 adapted to run on guide rails 6. Instead of a traveling sole traveling chains, carrying the plates or pans on which are placed the goods to be baked, may also be employed.

Part of the gases from the furnace (not shown) enter the bottom heat flues 7 (Figs. 1 and 3) traverse the side flues 8 controlled by dampers 22 to the lower transverse header 9 with which communicates one end of the series of tubes 10 located between the upper and lower stretches of the sole 2 and extending longitudinally of the oven. Said gases then traverse these tubes in the direction of the arrows (Figs. 1 and 2) to a transverse header 11 at the opposite end of the oven and leave the latter through lateral flues or channels 12 (Fig. 2) whence they pass into a transverse header 13 located above the sole 2 and with which communicates another series of longitudinal tubes 14 communicating at their opposite ends with a further transverse header 15. The gases traverse this upper series of tubes in the direction indicated by the arrows (Fig. 1) and leave the header 15 through lateral flues or channels 16 (Fig. 3) whence they pass into upper channels 17 communicating with a collecting flue 18 at the top of the oven, from which latter flue said gases pass to an uptake (not shown). Another part of the gases from the bottom heat flues 7 passes up lateral flues 19 (Figs. 1 and 4) to the top heat flues 20 whence they extend in both directions as indicated by the arrows in Fig. 1 through vertical end channels 21 into the aforesaid collecting flue 18 and thence to the uptake.

Communicating with the headers 11 and 13 are a series of pipes 23 and 24 respectively communicating with chambers 25 for providing access to the upper and lower series of tubes 10 and 14 and hand holes 26 provided with covers 27 are suitably located for providing access to the headers 9, 11, 13 and 15 as shown in Fig. 4. Other hand holes 28 provided with covers 29 are provided as shown in Fig. 1 for access to the top heat flues 20 and collecting flue 18 and sliding doors 30 are located at each end of the baking chamber 1, said doors having connected thereto chains 31 passing over pulleys 32 and provided with counter weights 33.

In Fig. 4, 34 indicates any suitable gearing for imparting motion to the rollers 5 and consequently to the traveling sole 2.

Figure 8:
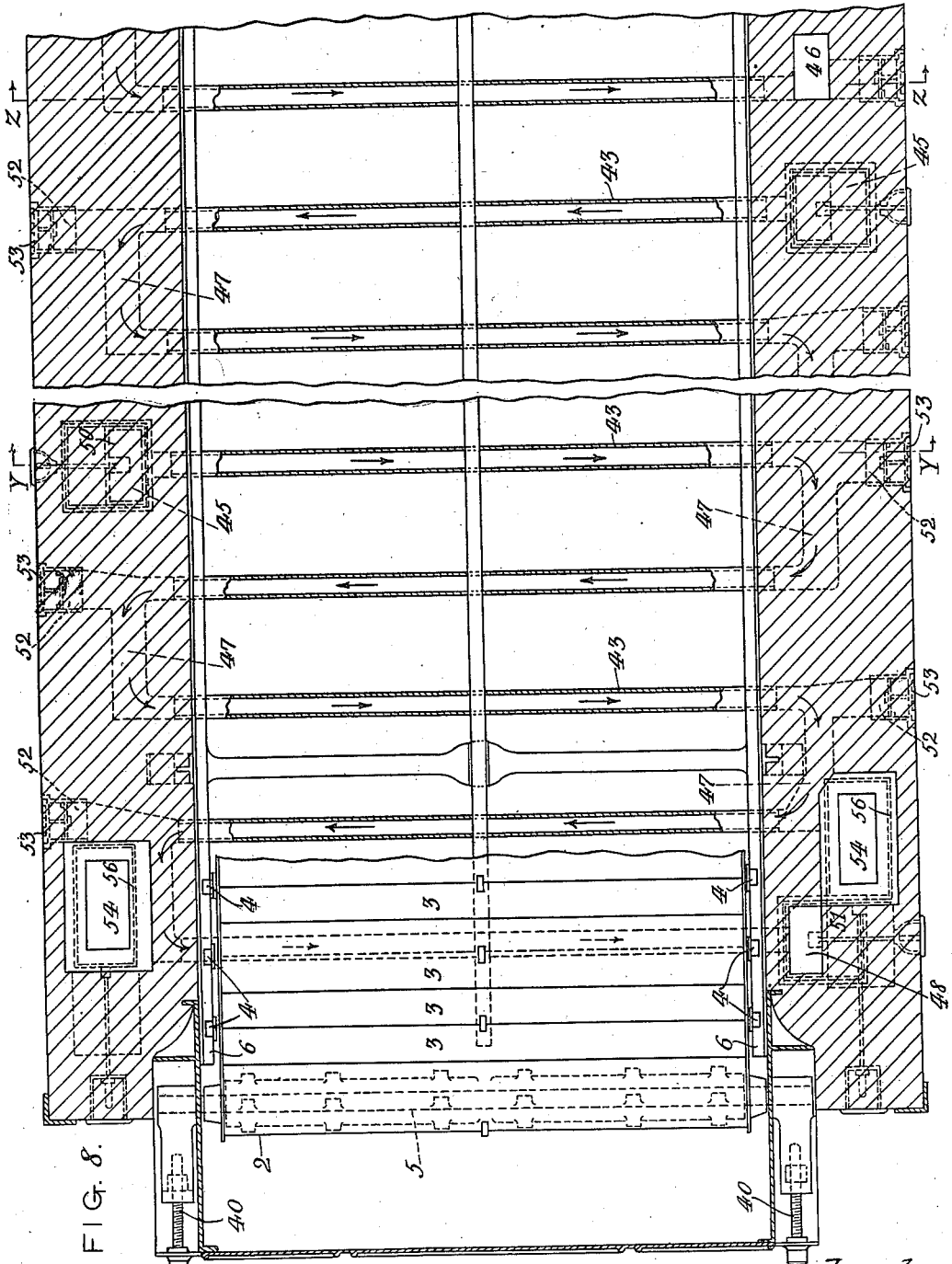
Figure 9:
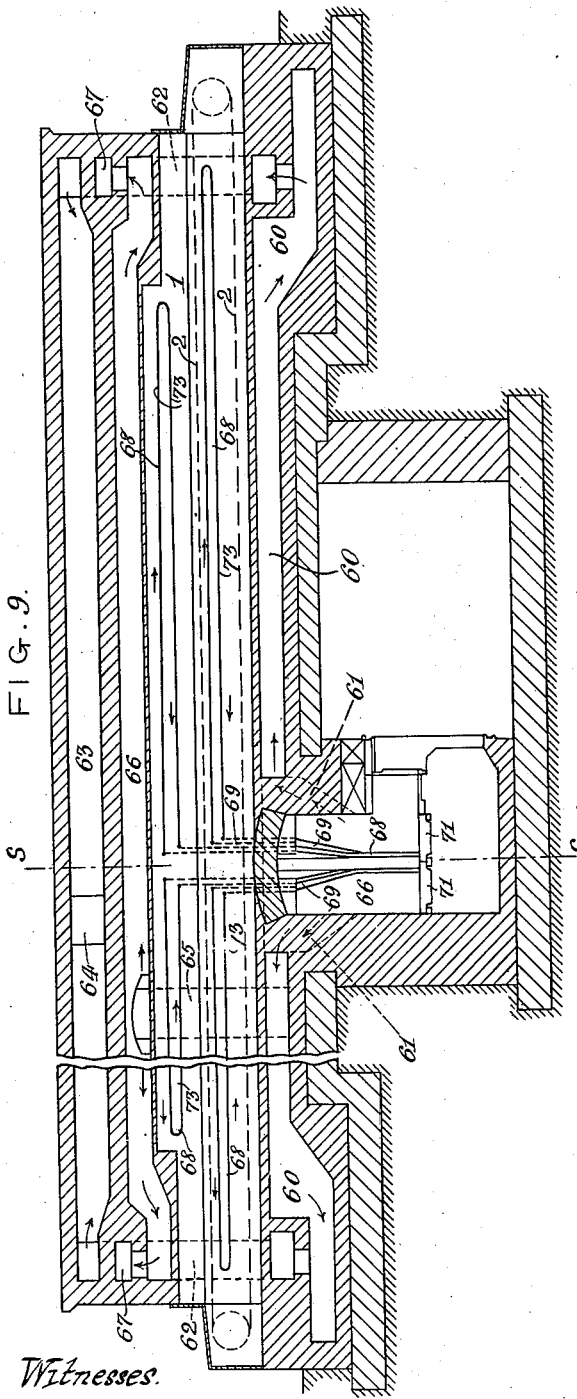
Figure 10:
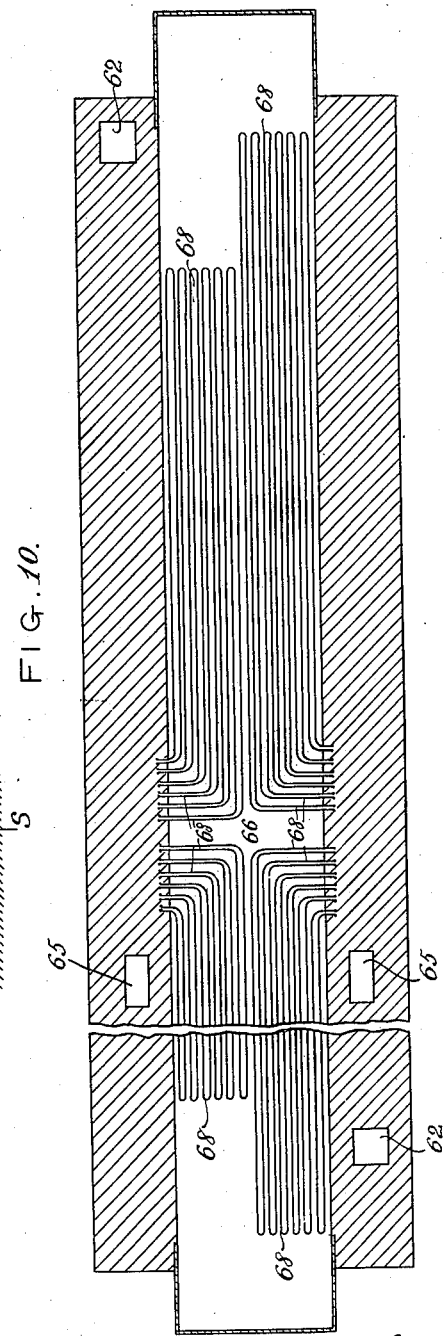

Referring now to Figs. 5 to 8, the construction of the sole 2 is similar to that previously described with reference to Figs. 1 to 4, 3 indicating the sole plates, 4 the guiding rollers thereon running on the rails 6, and 5 the polygonal carrying and driving rollers. Tensioning devices 40 for taking up slack of the sole are shown in Figs. 5 and 8. In this construction the baking chamber 1 and sole 2 are not disposed horizontally as in the previously described construction, but gradually rise toward one end of the oven as shown in Fig. 5.

Between the stretches of the sole 2 extend the lower series of transverse tubes 43 and above the sole is another series of transverse tubes 44, the said lower series 43 communicating at one end at intervals on opposite sides of the oven with vertical lateral flues 45 communicating with the lower heat chamber or flues 41 and at the other end with lateral flues 46 leading to the tube 44 above. One of the tubes of each pair communicates by means of a longitudinal channel 47 with one of the next pair of tubes and so on until one of said upper series extends into a by-pass flue 48 which communicates with the collecting flue 49. The tubes are thus divided into a number of groups having their gas inlets and exits disposed alternately on opposite sides of the oven, the course of the gases being clearly indicated by arrows in Figs. 6, 7 and 8. The lateral flues 45 and by-pass flues 48 are provided with controlling dampers 50 and 51 respectively, and hand holes 52 closed by covers 53 are suitably located to permit access to the tubes for cleaning purposes. Part of the gases from the lower flues 41 passes by means of vertical side flues 54 with the top heat flues or chambers 55, said flues 54 being controlled by dampers 56, and hand holes 57 closed by covers 58 are provided at suitable places for giving access to the collecting flue 49 and upper heat flues 55. The remaining reference numerals indicate corresponding parts to those described with reference to Figs. 1 to 4.

Referring now to Figs. 9 to 13 the construction shown therein includes the bottom heat flues 60 communicating with the centrally located furnace 66 by means of channels 61. The said flues 60 also communicate at each end of the oven on opposite sides thereof with vertical flues 62 extending into the collecting flue 63, provided with outlet 64, and also with lateral flues 65 extending into the top heat flues 66, the latter leading at each end into channels 67 which communicate with the collecting flue. In addition to said flues the oven also contains a series of tubes 68 containing water adapted to circulate therein, said tubes extending into and substantially forming the side walls of the furnace 66 and extending upwardly therefrom on either side into the baking chamber 1 in two series, one series longitudinally traversing the oven between the upper and lower stretches of the sole 2 (shown diagrammatically only for the sake of clearness of illustration) and the other extending above said sole. Each of these tubes is continuous, having two substantially vertical portions 69 connected by a return bend at the bottom as at 70 adjacent the furnace bars 71, said portions branching into two transverse portions 72 extending toward the center of the oven and then being bent rectangularly to form two portions 73 extending longitudinally of the oven connected at the end thereof by a return bend 74. This construction is repeated for each tube both of the upper and lower series and is duplicated on either side of the oven, both transversely and longitudinally, as shown diagrammatically in Fig. 10 of the drawings. The longitudinal series of tubes are separated or spaced on each side of the oven by means of members 75 extending from the interior of the oven walls 76.

The tubes are inserted in the oven during the building thereof, the upper parts of the vertical portions 69 being afterward inclosed in masonry 77 supported by metallic boxes or channels 78 carried by beams 79, see Fig. 11.

In any or all of the constructions above described the flues may be traversed by producer gas or the like instead of by the products of combustion from the furnace.

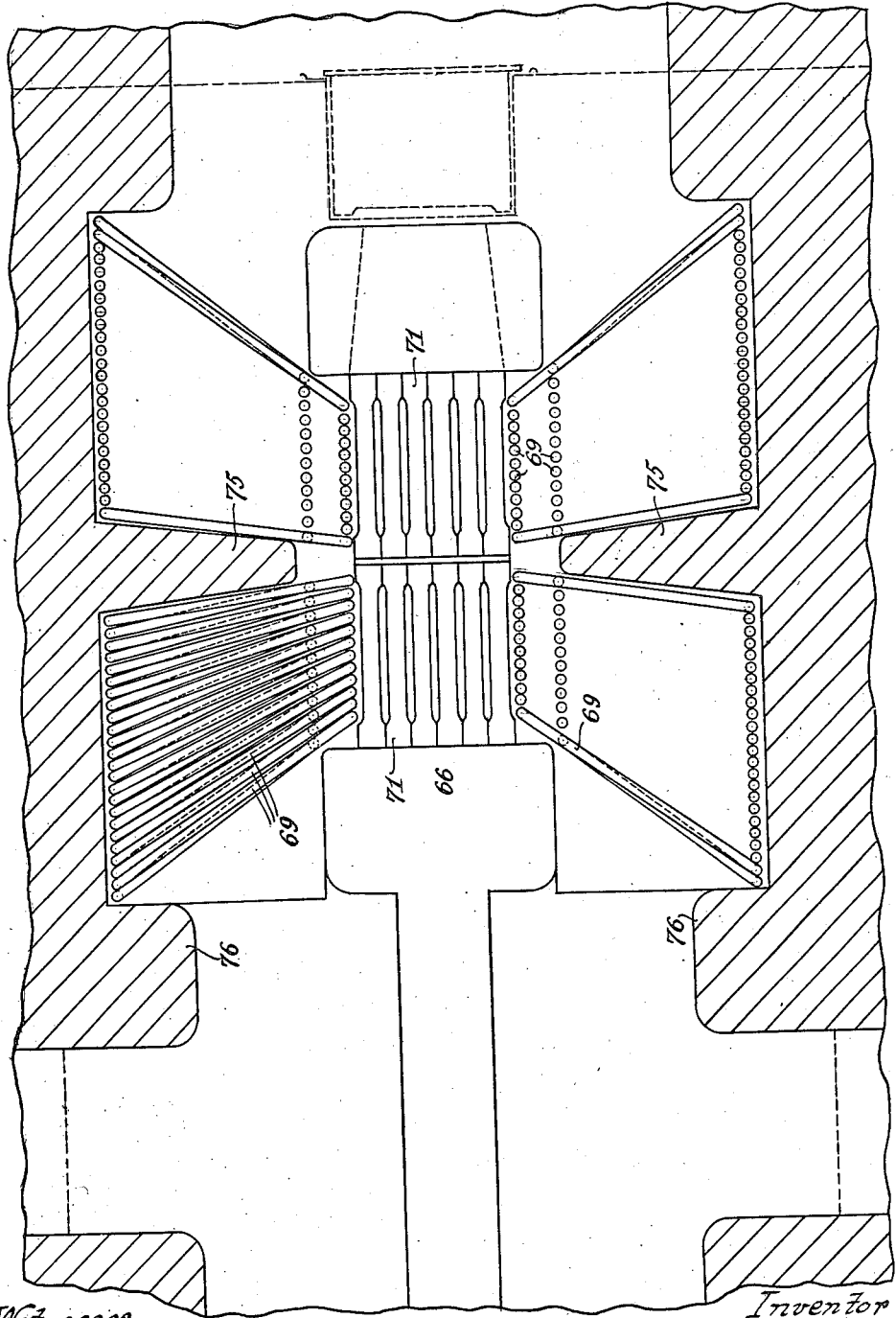

What I claim as my invention and desire to secure by Letters Patent of the United States is—

1. In a baker's oven, the combination with a baking chamber, of an endless traveling support therein for the goods to be baked, main heating flues arranged above and below said chamber for passage of gases for heating the said chamber, a series of tubes